United States Patent
Lipin et al.

(10) Patent No.: US 10,073,918 B2
(45) Date of Patent: Sep. 11, 2018

(54) CLASSIFYING URLS

(71) Applicant: Hewlett-Packard Development Company, L.P., Houston, TX (US)

(72) Inventors: Adi Lipin, Yehud (IL); Alon Berkoviz, Petach Tikva (IL); Boaz Shor, Yehud (IL); Eyal Kenigsberg, Dolev (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 419 days.

(21) Appl. No.: 14/457,517

(22) Filed: Aug. 12, 2014

(65) Prior Publication Data
US 2016/0048586 A1    Feb. 18, 2016

(51) Int. Cl.
*G06F 17/30* (2006.01)
(52) U.S. Cl.
CPC ............... *G06F 17/30876* (2013.01)
(58) Field of Classification Search
CPC ................................ G06F 17/30876
See application file for complete search history.

(56) References Cited

U.S. PATENT DOCUMENTS

| | | | |
|---|---|---|---|
| 7,680,858 B2 | 3/2010 | Poola et al. | |
| 8,489,523 B2 | 7/2013 | Wang et al. | |
| 8,838,602 B1* | 9/2014 | Zhang | G06F 11/3495 707/737 |
| 2004/0258300 A1* | 12/2004 | Proteau | G06T 3/40 382/162 |
| 2009/0063538 A1* | 3/2009 | Chitrapura | G06F 17/30887 |
| 2012/0158496 A1 | 6/2012 | Solomon et al. | |
| 2012/0271941 A1 | 10/2012 | Mirandette et al. | |

OTHER PUBLICATIONS

Song et al., "Exploring URL Hit Priors for Web Search", Microsoft Research Asia, Jan. 17, 2006, pp. 1-12.
Bamshad Mobasher, et al., "Creating Adaptive Web Sites Through Usage-Based Clustering of URLs", 1999, 7 pages.
M.Indra Devi et al. , "Machine Learning Techniques for Automated Web Page Classification using URL Features", IEEE, International Conference on Computational Intelligence and Multimedia Applications 2007, 2007, pp. 116-118.

* cited by examiner

*Primary Examiner* — Taelor Kim (57) ABSTRACT

According to an example, a Trie is formed from URLs and nodes of the Trie are assigned a weight. A node is selected based on its weight and child nodes of the selected node merged together. A URL classification is output based on a path in the Trie.

17 Claims, 9 Drawing Sheets

URL: a/c
URL: a/d
URL: b/d
URL:   b
URL:   b

CLASSIFYING URLS

BACKGROUND

Owners of services, such as a website or a remotely hosted application, may wish to know how their service is used. A Uniform Resource Locator (URL) is a specific character string which represents a reference to a resource. A web address is an example of a URL and in most web browsers the URL is displayed on top of the browser inside an address bar. URLs may be used to access services, such as websites or applications provided in the cloud or over a network. A service may include a plurality of URLs, with each URL corresponding to a particular aspect of the service such as a particular webpage or particular aspect of an application.

By monitoring user interaction with a service, the frequency with which each Universal Resource Locator (URL) is accessed or other statistics relating to each URL may be determined. Such statistics may be used to improve provisioning and levels of service, predict future traffic and/or for determining where to place adverts on a website or how to price advertising space etc.

BRIEF DESCRIPTION OF THE DRAWINGS

Examples will now be described, by way of non-limiting example only, with reference to the accompanying drawings, in which.

DETAILED DESCRIPTION

In the following description the terms "a" and "an" are used to denote the presence of one or more of a particular element. The term "comprising" means "including at least" and does not exclude the possibility of other elements.

The present disclosure discusses classifying URLs. In some examples a Trie is formed from URLs and nodes of the Trie are assigned a weight. A node may be selected based on its weight and child nodes of the selected node merged together. A URL classification is output based on a path in the Trie. By merging nodes, the Trie may be kept to a reasonable size which is easier to manage. Furthermore, merging nodes may help to reduce the total number of URL classifications.

Examples will now be described in more detail with reference to the accompanying drawings.

Figure 1:
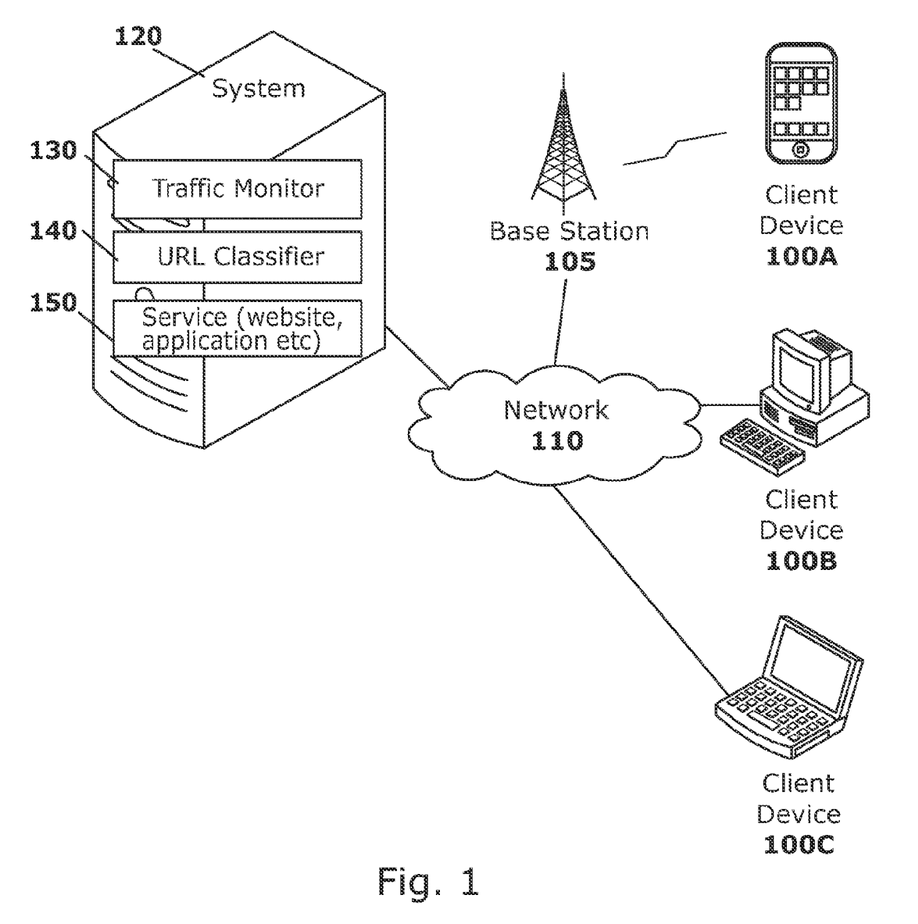
FIG. 1 is a schematic diagram showing an example system for classifying URLs.

FIG. 1 shows an example in which a client device 100A, 100B or 100C accesses a service 150 over a network 110. The service may for example be a website, an application or remotely hosted files. The service may be accessed via a plurality of URLs. That is a client device 100 connects to the service 150 over the network 110 by requesting access to a URL. The client device may be a computing device such as a desktop or laptop computer, tablet device, or smartphone etc. The network 110 may be any network such as an intranet or the internet etc. and may be accessed by the client device directly or via a number of intermediate forwarding devices such as switches, routers, access points or base stations. For instance, a mobile client device 100A may access the network via a telecommunications network including a base station 105.

A system 120 hosts the service 150 and classifies the accessed URLs. The accessed URLs may be grouped into URL classifications and each URL classification may include one or more URLs. The system 120 may for example include a traffic monitor 130 and a URL classifier 140. The traffic monitor 130 is to monitor traffic on the network and in particular traffic associated with the service 150. The traffic monitor may for instance notify the URL classifier each time a URL belonging to the service is accessed. The URL classifier 140 receives information on the accessed URLs and classifies the URLs. The system 120 may for example be hosted on a single computing device or distributed among a plurality of computing devices. A computing device is a device that is able to process data and includes but is not limited to a server. The traffic monitor 130, URL classifier 140 and service 150 may be hosted on the same computing device or hosted on different computing devices. The URL classifier 140 may be a part of the traffic monitor 130 or may be a separate component or application.

Figure 2:
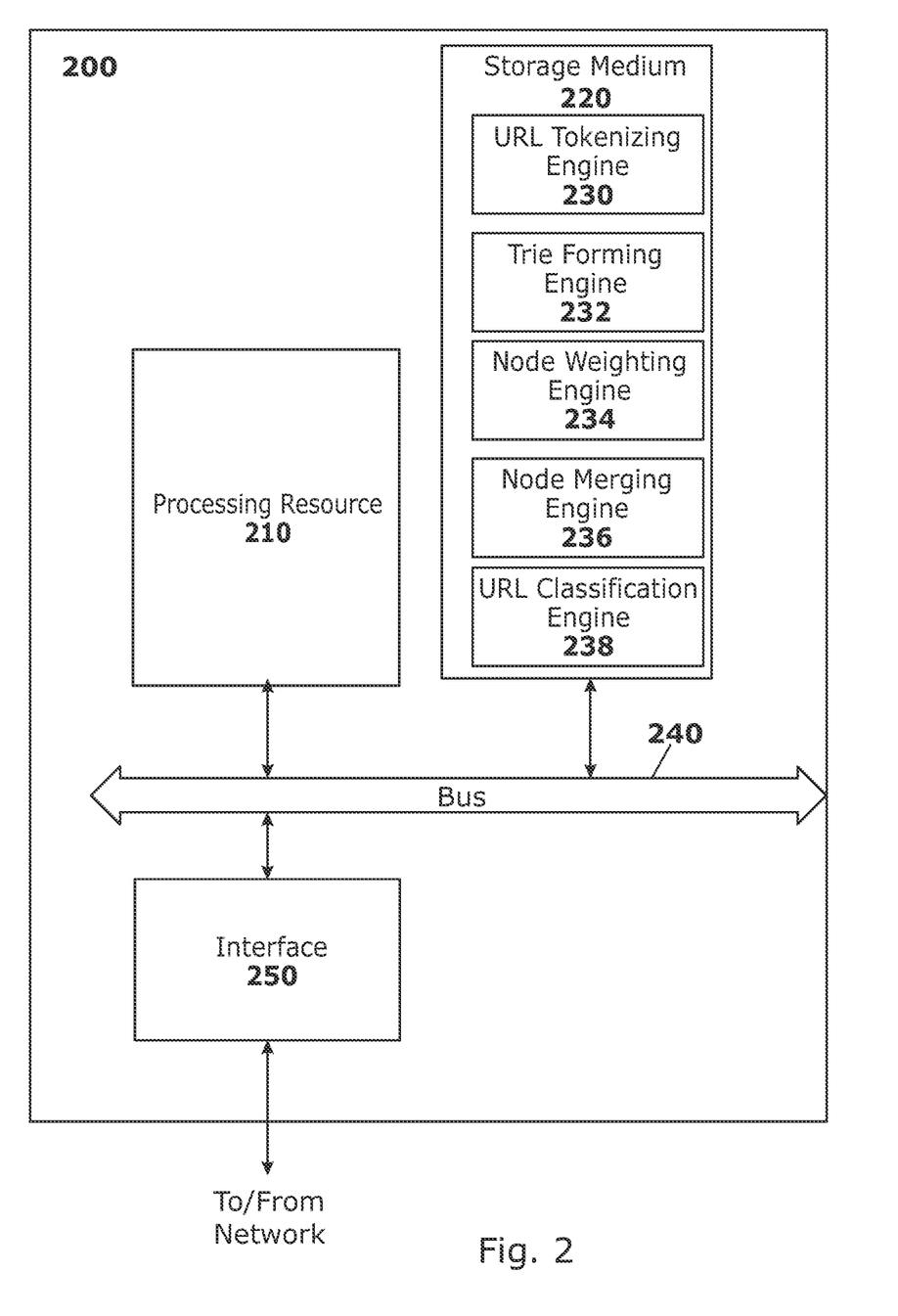
FIG. 2 is a system diagram showing an example system for classifying URLs.

FIG. 2 shows an example of a system 200 for classifying URLs in more detail. The system may for instance be implemented by a server hosting the URL classifier 140. The system includes a processing resource 210 and a non-transitory machine readable storage medium 220. The system 200 includes a URL tokenizing engine 230, a Trie forming engine 232, a node weighting engine 234, a node merging engine 236 and a URL classification engine 238. These engines may be implemented as machine readable instructions stored in the storage medium and executable by the processing resource. The system may also include an interface 250 to connect to a computer network or other devices and a bus 240 or other communication medium connecting the processing resources, storage medium and communication interface.

In examples described herein, a processing resource may include, for example, one processor or multiple processors included in a single computing device such as a server (as shown in FIG. 2) or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. Processing resource 210 may fetch, decode, and execute instructions stored on storage medium 220 to perform the functionalities described below. In other examples, the functionalities of any of the instructions of storage medium 220 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

An example method of classifying URLs using the system of FIG. 2 will now be described with reference to the flow diagram of FIG. 3.

At block 310 a URL is received by the URL tokenizing engine 230. For instance the URL may be received due to a user accessing said URL. In one example the URL is received as a notification from a traffic monitor. The notification includes the URL and may include further information such as, for example, an identity of the user or characteristics of a user accessing the URL.

In one example a URL is received by the URL classifying system each time there is an access by a user. The same URL may thus be received multiple times. In other examples the URL classifying system may receive in bulk information on URLs accessed in a particular period. In any case the system may be able to keep a count of the number of times a particular URL is accessed. This is distinct from many web crawler systems which may analyze the structure or content of a website, but count each URL from a website only once which makes it difficult to determine the relative popularity or importance to users of different URLs.

At block 320 the URL tokenizing engine 230 splits each received URL into a plurality of tokens. Each token corresponds to a portion of the URL and may be referred to as a URL path token. Division of the URL into tokens may be based on standard delimiters in the URL such as "/", "=", "." etc or by other criteria. For instance the URL www.companyA.com/products/books/Elizabeth may be tokenized by splitting into the following tokens "companyA.com", "products", "books" and "Elizabeth". In this example the domain name "companyA.com" is included in the tokenized URL; in other examples the domain name may be omitted from the tokenized URL.

At block 330 the Trie forming engine 232 forms a Trie from the tokenized URLs. A Trie is an ordered tree data structure that includes a plurality of nodes. Each node corresponds to a token. According to one example, all of the received URLs may be integrated into the same Trie. For instance a Trie may be formed when the first URL is received and subsequent URLs may be added to the same Trie as they are received.

Figure 4A:
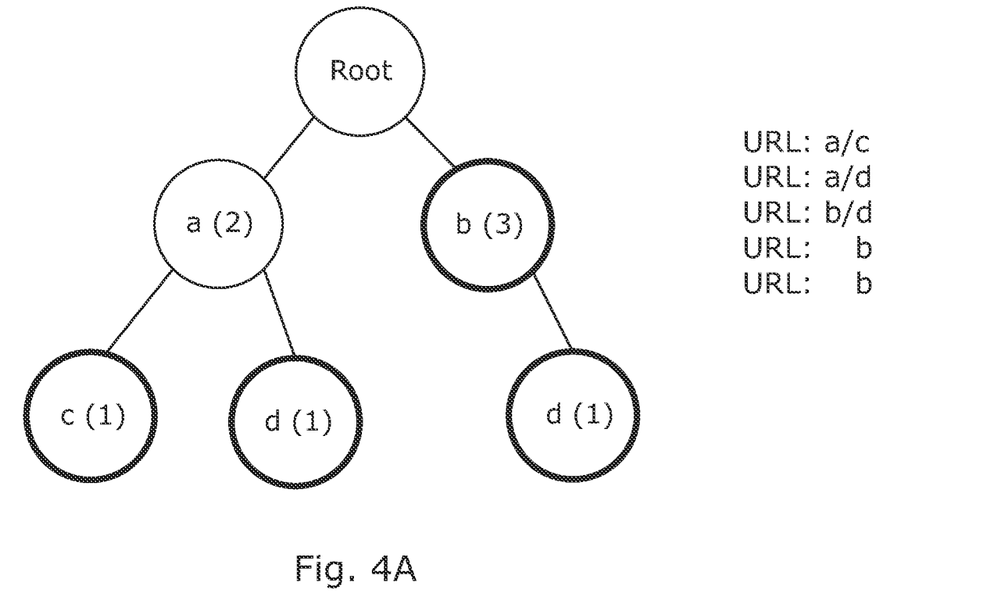
FIGS. 4A and 4B are diagrams showing example Tries.

FIG. 4A shows an example of a plurality of URLs and a Trie formed from the URLs. For ease of reference in the diagram each URL is given a simplified form with the letters "a", "b", "c" and "d" forming delimited parts of the URL path. So while the URLs a/c and a/b are shown as an example, in practical applications the URLs might be companyA/books or companyA/music etc.

In FIG. 4A the URLs received by the URL classifier are:— a/c, a/d, b/d, b, b

A Trie is formed from these URLs, with each node of the Trie corresponding to a URL path token. The Trie comprises a plurality of nodes. The first node is a root node and may be empty. Each of the other nodes corresponds to a URL path token. The nodes are arranged in hierarchical order, so for instance two nodes corresponding to sequential tokens in the URL path are connected by an edge. In this way each URL path can be traced in the Trie. A node connected to a higher level node by an edge is a child node of the higher level node. For instance in FIG. 4A node "c" on the path a/c and the node "d" on the path a/d are both child nodes of node a. These nodes may be referred to as children of node "a".

According to some examples domain names may be included in the Trie. According to other examples domain names may be omitted from the Trie. Omitting domain names from the Trie may for instance allow the Trie to collate data from mirror sites on different servers, which have different domain names but the same content. For instance, where domain names are omitted from the Trie, a user access to a URL originalsite.com/A./B and a user access to a URL mirrorsite.com/A/B would both result in the path NB being entered into the Trie below the root node.

Figure 5:
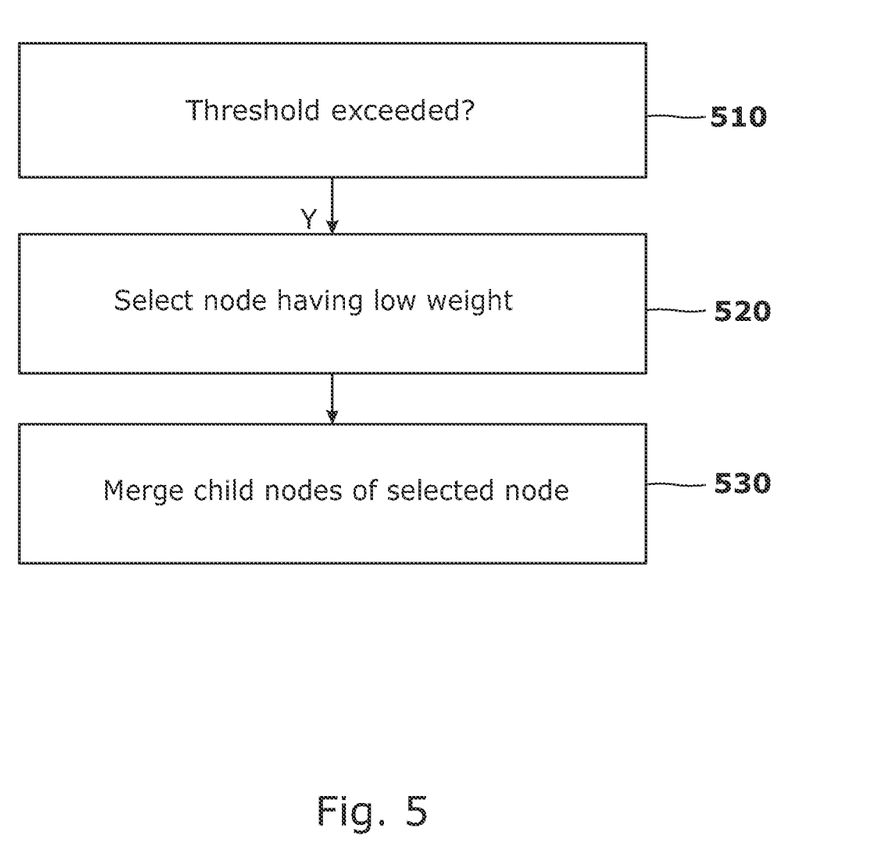
FIG. 5 is a flow diagram showing an example method of merging nodes in a Trie.

Each node has a name (in this example "a", "b" etc) which may correspond to the token name. The token name may correspond to the portion of the URL path which it corresponds to; for instance companyA/books may be tokenized to give two tokens with the names "companyA" and "books" respectively. Nodes corresponding to a final token in a URL are referred to as descriptor nodes. In FIG. 5 the descriptor nodes are nodes "b", "c" and "d" and they are marked with a bold border. A leaf node is a node which has no children. Note that a descriptor node is often a leaf node, but is not always a leaf node. For example node "b" in FIG. 4A is not a leaf node, but is a descriptor node as it corresponds to the final token in one of the received URLs.

The Trie forming engine 232 may count the number of hits to each node in the Trie. The number of hits to a node is defined as the number of times a URL including the node is received. In one example the number of hits to a node is the number of times any URL which includes the node is accessed by a user. The number of hits for each node in FIG. 5A is placed in brackets after the node name. So node "a" has two hits as it is included in the URLs a/c and a/d; node "b" has three hits as it is included in the URLs, b (received twice) and b/d. Nodes "c" and "d" are each included in one URL, a/c and a/d respectively, and thus have one hit each. Note that the final node in the path a/d and the final node in the path b/d may have the same name, but they are separate nodes as they are located in separate paths in the Trie.

The Trie forming engine may also remove nodes from the Trie if there are no hits to that node in a predetermined period. The predetermined period may for instance be a number of received URLs, a period of time or volume of traffic. Removing nodes from the Trie in this fashion may help to stop the Trie getting too large and may help to ensure that the Trie includes more representative nodes. Infrequently accessed URLs or URLs which are no longer accessed may be purged from the Trie in this manner.

At block 340 the node weighting engine 234 assigns a weight to nodes and at block 350 the node merging engine 236 merges certain nodes. Merging nodes may help to limit the size and/or complexity of the Trie, thus making it more manageable. At 360 the URL classification engine 238 outputs a URL classification based on a path in the Trie. If the output URL classification engine includes a merged node then the URL classification may cover a plurality of related URLs.

In one example the nodes are merged by the node merging engine 236 in response to a threshold event. The threshold event may be a threshold event that relates to the Trie as a whole, or a threshold event that relates only to a part of the Trie or only to a particular node. An example of a threshold event relating to only part of the Trie or a particular node, but not the Trie as a whole, may for instance be a total number of nodes in a particular branch of the Trie, or a total number of child nodes of a particular node or total hits to a particular node being below or above a predetermined number, without reference to the rest of the Trie.

In contrast, examples of a threshold event relating to the Trie as a whole may for example include, but are not limited to, any of the following: the total number of nodes in the Trie exceeded a predetermined number, a predetermined traffic threshold being exceeded, a predetermined period of time having passed or a predetermined number of URLs having been accessed etc. Merging nodes in response to a threshold event relating to the Trie as a whole may help to ensure a balanced approach to merging nodes. For instance, it may be less likely to prematurely merge nodes if an atypically large number of hits are received to a particular URL early on while the Trie itself is still small.

Figure 3:
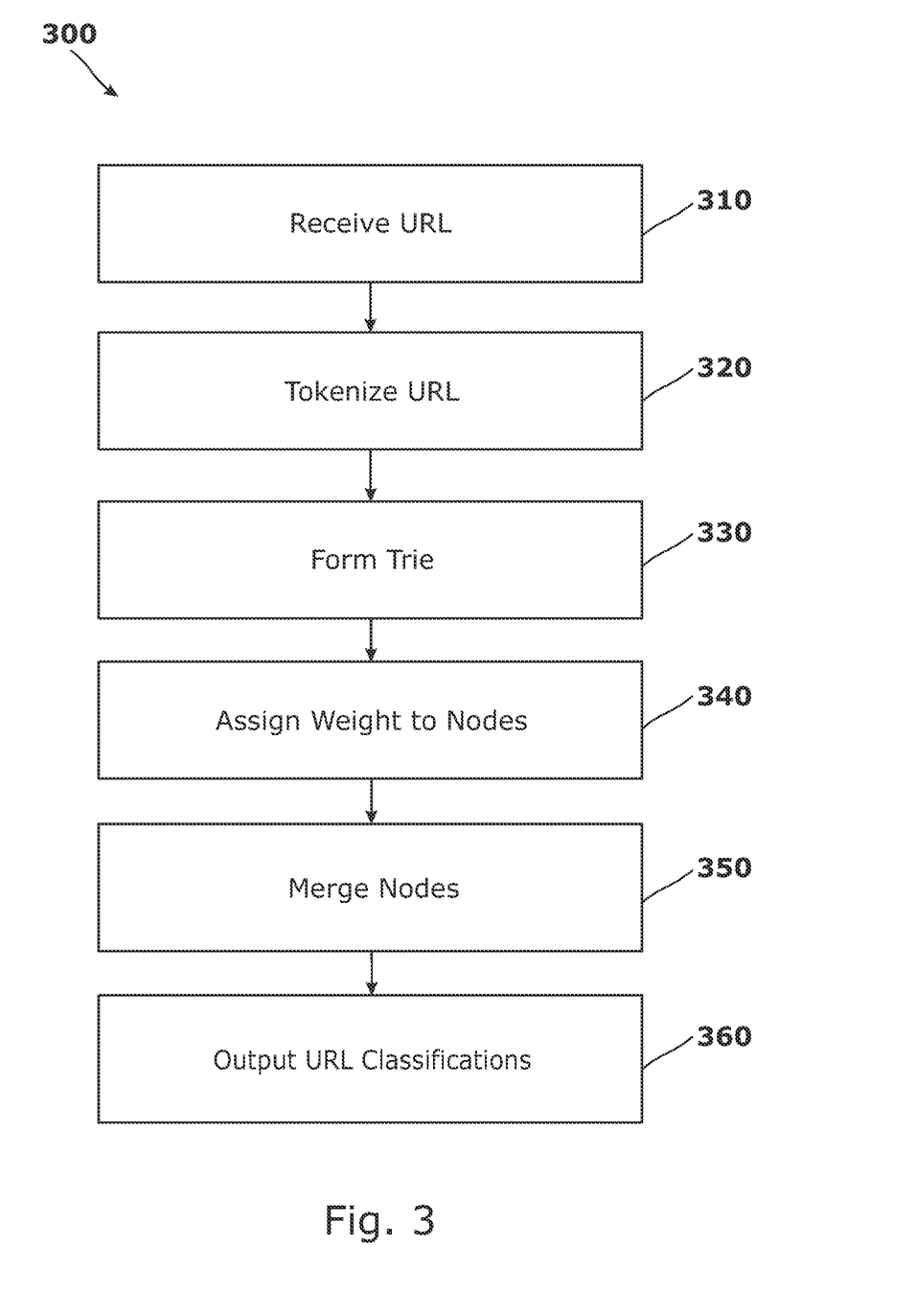
FIG. 3 is a flow diagram showing an example method of classifying URLs.

FIG. 5 shows an example method for the node merging engine 236 which may correspond to method block 350 in FIG. 3. At block 510 the node merging engine determines if a threshold has been exceeded. If the threshold has been exceeded then at block 520 the node merging engine selects a node having a low weight. At block 530 the child nodes of the selected node are merged together.

Blocks 520 and 530 may be repeated until the parameter on which the threshold is based no longer exceeds the threshold. For example if the threshold is a total number of X nodes in the Trie and after receiving a URL and incorporating it into the Trie, the Trie increases to a size of X+20 nodes, then 20 or more nodes may be merged so that the threshold is no longer exceeded. In other examples blocks 520 and 530 may be repeated periodically, for instance based on a predetermined period of time, number of accessed URLs or volume of traffic since the last merging of nodes.

Examples of the node weighting and merging operations will be described in more detail below.

Figure 4B:
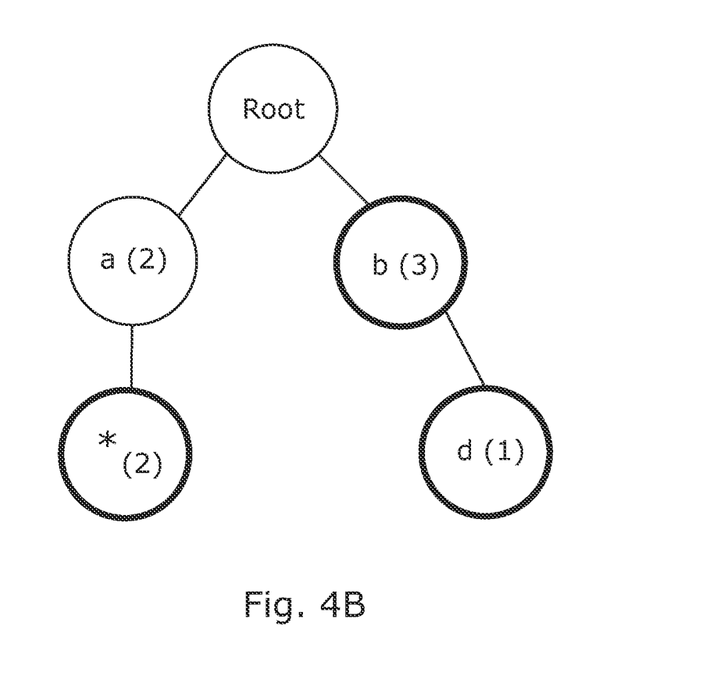

FIG. 4B shows an example of the Trie of FIG. 4A after some of the nodes have been merged. Specifically, the nodes "c" and "d" which are child nodes of node "a" have been merged.

In one example suppose there are two URLs taken from a book store web system: bookstore/viewProduct/RobinHood and bookstore/viewProduct/Elizabeth. In this case these two URLs may be classified into the same URL group: bookstore/viewProduct/*. The nodes corresponding to RobinHood and Elizabeth have been merged into merged node represented by a merged node token. In this example the merged node token is the symbol "*" and thus may be termed an asterisk node, but in other examples different symbols or character strings may be used to denote a merged node. Where a plurality of nodes have been merged and at least one of said plurality of nodes is a descriptor node, the merged node is considered to be a descriptor node.

At block 360 the URL classification engine determines a URL classification and outputs the URL classification. Outputting the URL classification may also be referred to as publishing the URL classification and may for example involve saving the URL classification to a file, displaying the classification on a display or notifying a system administrator of the classification etc.

The URL classification engine may output a plurality of URL classifications. Each URL classification is based on a path through the Trie, e.g. it may start with a child node of the root node and terminate in a descriptor node. As some of the nodes in the Trie have been merged, one or more of the output URL classifications may include a merged node token. For instance, referring to the example above bookstore/viewProduct/* may be output as a URL classification, where "*" is a merged node token. Referring to FIG. 4B, three URL classifications may be output: a/*, b and b/d.

Merging nodes may help to reduce the number of URL classifications and/or may help to ensure that URLs of a similar type are grouped together. In addition, in some examples the URL classification engine may limit the number of URL classifications so as not to exceed a certain predetermined number. Limiting the number of URL classifications may make the URL classifications easier to manage and understand.

The way in which nodes are selected for merging may affect the representativeness of the URL classifications. Nodes may be merged according to a weight of their parent node. According to one example the node merging engine 236 selects a node having a low weight and merges together child nodes of said low weight node.

A low weight node is a node which has a low weight relative to other nodes in the Trie as a whole. For example the node having the lowest weight in the Trie may be selected and its children merged together. While in many examples it may be the lowest weight node which is selected, in other examples a node having the second lowest weight, third lowest weight or fourth lowest weight etc may be selected and its children merged together. In still other examples, a node having a weight in the lowest $5^{th}$ or $10^{th}$ percentile compared to other nodes in the Trie may be selected and its child nodes merged together.

Merging together children of a low weight node may result in less important nodes being merged together, thus reducing the possible number of URL classifications and helping to ensure that each URL classifications is relatively important.

When selecting a node whose children are to be merged together, nodes which have no child nodes or only one child node may be excluded. Such nodes may for instance be marked by giving them a zero weight or marked in another manner and then excluded from the selection.

The node weighting engine 234 assigns a weight to each node in the Trie. Each time a new URL is added to the Trie, the node weighting engine may calculate the weight of any newly added nodes, determine if any existing nodes have a changed weight and calculate the new weight of any nodes whose weight has changed.

The node weighting engine 234 may assign a weight to a node in the Trie based on a node weighting function. The function may for example be based on one or more of the following: the number of hits to the node, the number of descriptor nodes in the node's sub-tree, a number of child nodes of the node, a number of child nodes of the node which are numeric nodes, and a variance in number of hits between the child nodes of the node. Variance in number of hits between different nodes may for instance be measured by a standard deviation in number of hits. The sub-tree of a node is all of the nodes beneath the node and directly or indirectly connected by an edge, e.g. the node's children, grandchildren etc. A numeric node is a node corresponding to a URL token which includes at least three digits. The numerical node may contain only numbers or may contain a mixture of numbers, letters and/or other characters. E.g. 456 and 45677 would both be considered numerical nodes, but 44 would not as it is only two digits long. Product 234 or a9898bu899 would be considered numeric nodes as they include at least three digits.

In one example the node weighting function is such that the weight of a node increases as the number of hits to the node increases and decreases as the number of descriptor nodes in a sub-tree of the node increases. This may help to ensure that nodes are merged in a meaningful fashion. For instance take a first node which has two children which are descriptor nodes and each of which receives one hundred hits. Compare this first node to a second node which has fifty children which are descriptor nodes, each of which has one hit. In this case the second node will have lower weight and its children may be merged into a single merged node. The path from the second node to the single merged node may form the basis for a single URL classification which includes fifty URLs (as it originally corresponded to fifty descriptor nodes). Meanwhile, the more frequently accessed children of the first node are not merged and may have their own URL classifications.

In one example the node weighting function for assigning a weight to a node may be as follows:—

$$\text{weight(node)} = \frac{\text{hits}}{\text{descriptor nodes}} + std \text{ deviation} + \frac{1 - \text{numeric nodes}}{\text{\#children}}$$

In which:—
hits=the node's number of hits
descriptor nodes=number of descriptor nodes in the node's sub tree
numeric nodes=number of child nodes with a name holding more than 3 digits
std deviation=the standard deviation of the node's children's number of hits In this way nodes with a large number of hits are given more weight, but this is reduced as the number of unique URLs associated with the node (as indicated by the number of descriptor nodes in the node's sub-tree) increases.

Furthermore, nodes having a greater variation in the number of hits to their child nodes have a greater weight. This may help to prevent nodes with some very frequently accessed descriptor nodes in their sub-tree being collapsed. Such descriptor nodes may be important enough to justify their own classification.

The final term in the above function decreases the weight of a node as the percentage of child nodes which are numeric nodes increases. Numeric nodes are often parameters, product numbers etc and thus good candidates to collapse into a more generic URL classification by merging them together.

Figure 6A:
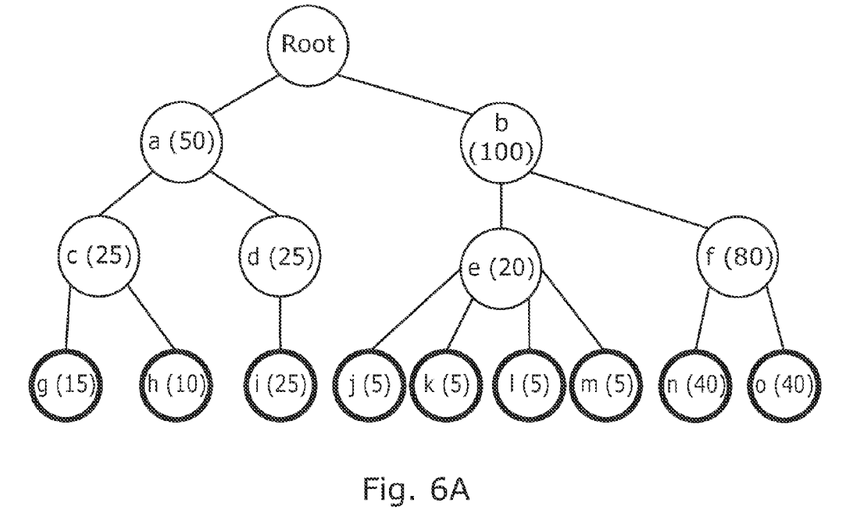
FIGS. 6A to 6E are diagrams showing example Tries.

FIG. 6A shows a larger Trie as one example. In the diagram, each node is identified by a letter and the number in brackets indicates the number of hits to that node. If the above equation is used as the weighting function then the nodes will have weights as follows (to one decimal place): a (16.6), b (58), c (16), d (25), e (5), f(40). This assumes none of the nodes are numeric nodes. In this example weights for the leaf nodes are not calculated as they have no children that can be merged.

Figure 6B:
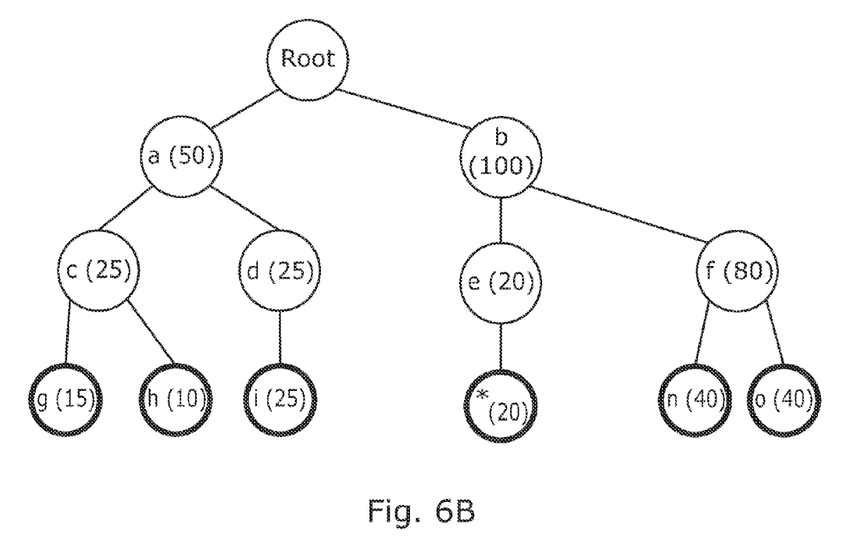

Node "e" has the lowest weight. This is partly because node "e" has a large number of descriptor nodes in its sub-tree and the child nodes have little variance in terms of hits. As node "e" has the lowest weight it is selected and its children or child nodes j, k, l and m are merged together to form a merged node * as shown in FIG. 6B.

Figure 6C:
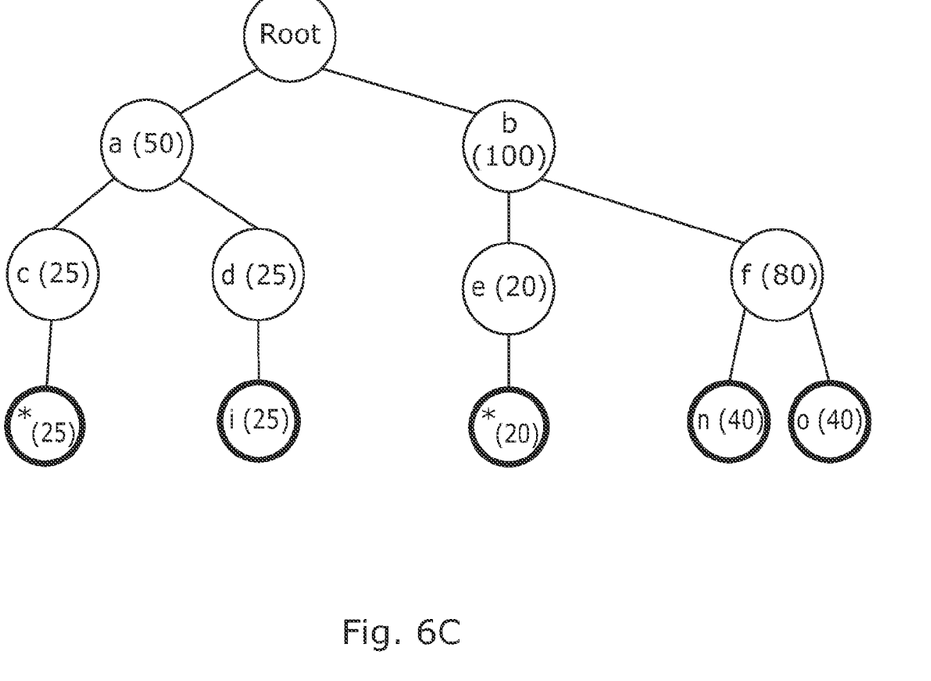

The weight of the nodes may then be re-calculated and would be as follows: a (16.6), b (75), c (16), d (25), e (20), f (40). Note that the "e" node has an increased weight as its child nodes have been merged and these child nodes were descriptor nodes, so the number of descriptor nodes in its sub-tree has reduced from four to one. Node "b" has increased weight for similar reasons. If another node is to be collapsed then this would be node "c" which has a weight of 16. Node "c" is therefore selected and its child nodes "g" and "h" merged into a merged node "*" as shown in FIG. 6C.

Figure 6D:
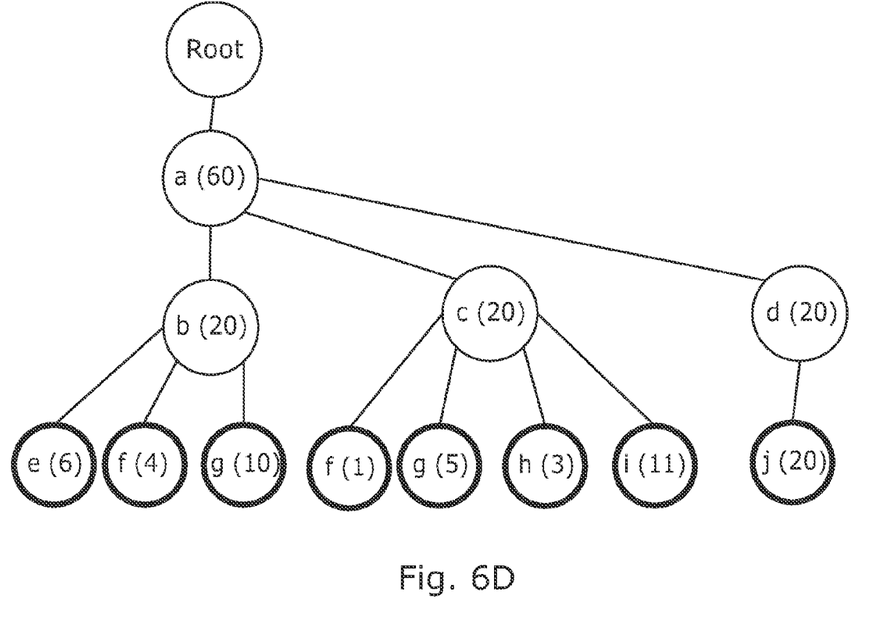
Figure 6E:
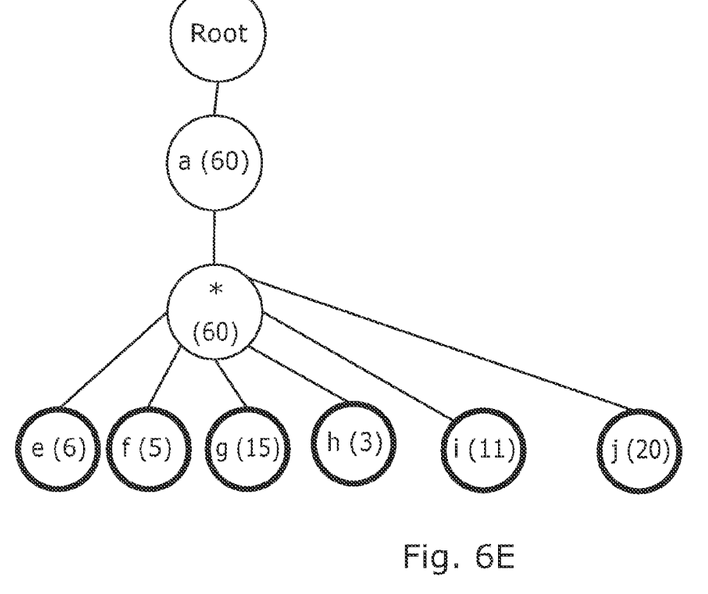

In other examples, it may be that the nodes to be merged are not descriptor nodes. For instance in FIG. 6D the nodes would have weights as follows (to the nearest whole number and assuming no numeric nodes): a (8), b (10), c (9), d (20). Thus node "a" would be selected and its children "b", "c" and "d" merged into a merged node "*" as shown in FIG. 6E. As nodes "b", "c" and "d" have children, their sub-trees would be merged into a single sub-tree under the merged node "*" as shown in FIG. 6E.

As mentioned above the URL classification engine 238 outputs the URL classifications. In one example the URL classification engine waits until the Trie is stable and outputs URL classifications after the Trie is determined to be stable. For instance the Trie may be deemed to be stable after an initial stability period. The stability period may for example be defined as a period of time, traffic volume or number of URLs received. In another example the URL classification engine may make a determination that the Trie is stable based on the order of nodes in the Trie by weight. For instance the Trie may be determined to be stable when the order of nodes by weight has not changed in a predetermined period or the number of changes to the order in a predetermined period is below a predetermined threshold. The predetermined period may for instance be a number of URLs received, traffic volume or period of time.

Outputting URL classifications when the Trie is stable, but not outputting URL classifications when the Trie is not stable, may help to ensure that the output URL classifications are independent of the order in which the URLs are received by the system. For instance if a large number of hits to a particular URL are received in the early stages this may not unduly influence the URL classifications as long as other URLs are received before the URL classifications are determined and output. Further, the system 200 may continue to receive URLs and update the Trie even after the URL classification starts outputting URL classifications.

Furthermore, before outputting a URL classification the URL classification engine may check that the URL path in the Trie which the URL classification is based on is finalized. For instance in the bookstore example, a URL path bookstore/viewProduct/* is probably finalized as it is unlikely new nodes will be added, but a URL path bookstore/viewProduct/RobinHood is probably not finalized as it can be expected that there will be many other products in the bookstore which users will access. A URL path is considered finalized when all of the nodes in the path are considered finalized. A node is considered finalized when no new children have been added to the node in a predetermined period. The predetermined period may for instance be a number of URLs received, traffic volume or period of time. Checking that a URL path is finalized according to the above criteria may help to prevent URL paths that are liable to change from being output as a URL classification.

Figure 7:
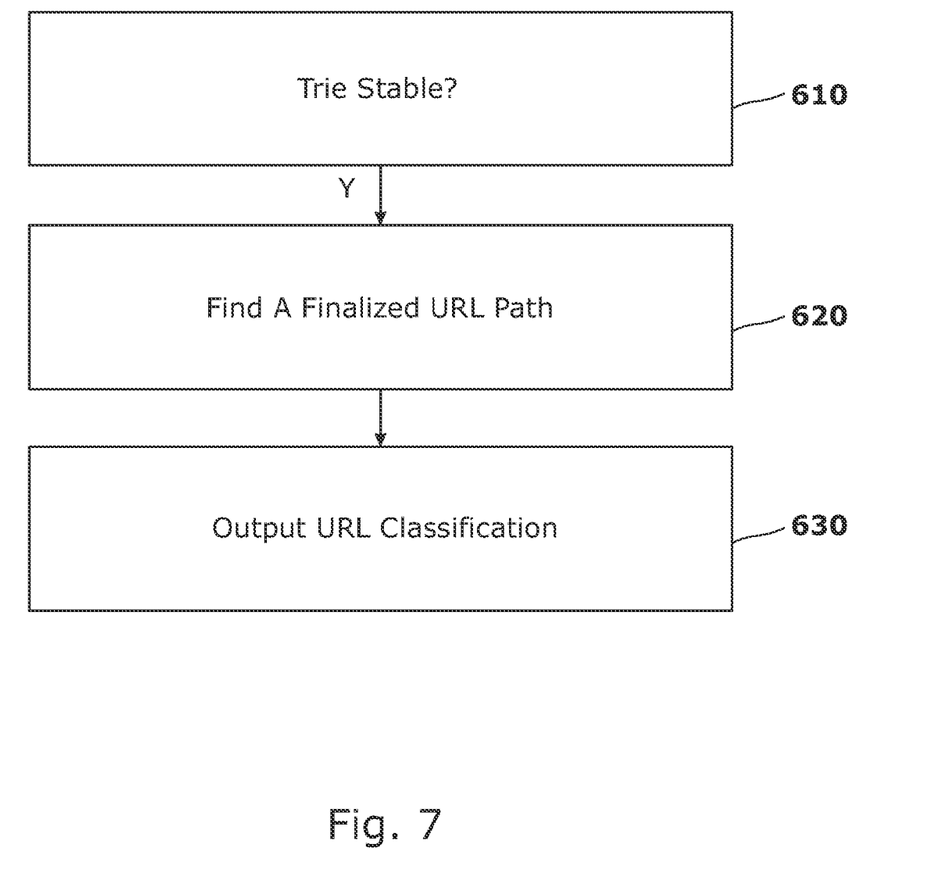
FIG. 7 is a flow diagram showing an example method of classifying URLs.

FIG. 7 shows an example method for the URL classification engine 238. This may be correspond to the method block 360 in FIG. 3. At block 610 of FIG. 7 it is determined if the Trie is stable, as discussed above, and if so the method proceeds to block 620. At block 620 the URL classification engine finds a URL path which is finalized. At block 630 the engine outputs the finalized URL path as a classification. This process may be repeated until all finalized URL paths have been output (e.g. published) as a classification or until a predetermined maximum number of URL classifications have been output. Limiting the number of URL classifications to a predetermined maximum number may make the URL classifications easier to manage and understand.

Especially from the point of view of a human user it may be more difficult to visualize and comprehend a classification system which has a very large number of unique classifications. Therefore limiting the number of URL classifications may make the URL classifications easier to use, manage and understand. Further, in some examples, by merging child nodes of a low weight node, related but infrequently accessed URLs may be grouped together into a same URL classification, while frequently accessed URLs may maintain their own unique classification.

What is claimed is:

1. A method of classifying Universal Resource Locators (URLs) comprising:
   monitoring user traffic to a service and determining URLs accessed by a user;
   tokenizing each of the URLs into a plurality of tokens, each token corresponding to a portion of the respective URL;
   forming a Trie from the tokenized URLs, wherein the Trie includes nodes, and each node of the Trie corresponds to one of the plurality of tokens of each URL;
   assigning weights to the nodes in the Trie based at least in part on monitored user traffic to the nodes, wherein assigning weights to the nodes in the Trie comprises assigning a weight to each node in the Trie based on a number of times a URL including the node has been accessed by a user and a number of descriptor nodes in a sub-tree of the node, wherein a descriptor node is a node that corresponds to a final token of a URL;
   determining whether a total number of nodes in the Trie exceeds a threshold;
   in response to a determination that the total number nodes of the Trie exceeds the threshold, selecting a node having a lowest weight in the Trie and merging child nodes of said selected node; and
   outputting a URL classification based on a path in the Trie.

2. The method of claim 1, further comprising:
   determining that a path from a root of the Trie to one of the descriptor nodes is finalized if no new child node has been added to any node in said path after a predetermined period; and
   outputting the finalized path as a URL classification.

3. The method of claim 1, comprising outputting no URL classifications until the Trie is determined to be stable and determining that the Trie is stable when an order of nodes by weight in the Trie has not changed in a predetermined period or determining that the Trie is stable when a number of changes to an order of nodes by weight in the Trie in a predetermined period is below a predetermined threshold.

4. A non-transitory machine readable storage medium comprising instructions that when executed by a processing resource cause the processing resource to:
   receive Universal Resource Locators (URLs);
   tokenize each URL into a plurality of tokens, each token corresponding to a portion of the respective URL;
   form a Trie from the tokenized URLs, wherein the Trie includes a plurality of nodes, each node of the Trie corresponds to one of the tokens of each URL, and wherein a node corresponding to a final token of a URL is a descriptor node;
   assign a weight to each node in the Trie based on a number of times a URL including the node has been accessed by a user and a number of descriptor nodes in a sub-tree of the node, wherein a descriptor node is a node that corresponds to a final token of a URL, and the weight of each node increases as a number of hits to the node increases;
   determine whether a total number of nodes in the Trie exceeds a threshold number;
   in response to a determination that the total number of nodes in the Trie exceeds the threshold number, select, from among the plurality of nodes in the Trie, a node having a lowest weight and merge child nodes of said selected node into a single merged node; and
   output a URL classification based on a path in the Trie.

5. The non-transitory machine readable storage medium of claim 4, wherein the instructions are to cause the processing resource to tokenize each URL into a plurality of tokens and form a Trie from the URLs such that the Trie does not include any domain names.

6. The non-transitory machine readable storage medium of claim 4, wherein the instructions are to cause the processing resource to output the URL classification only after determining that the Trie is stable.

7. The non-transitory machine readable storage medium of claim 4, wherein the instructions are to cause the processing resource to remove a node from the Trie if there are no user accesses to a URL including said node in a predetermined period.

8. The non-transitory machine readable storage medium of claim 4, wherein, to assign a weight to each node, the instructions are further to cause the processing resource to assign a weight to each node based on at least one of a percentage of child nodes of said node which are numeric nodes and a variation in a number of hits between child nodes of said node.

9. The non-transitory machine readable storage medium of claim 4, wherein the instructions are to cause the processing resource to limit a number of output URL classifications to no more than a predetermined number.

10. A system for classifying URLs comprising:
    a processing resource; and
    a non-transitory machine readable storage medium storing instructions that when executed by the processing resource cause the processing resource to:
    receive URLs that have been accessed by a user and split said URLs into a plurality of URL path tokens, each URL path token corresponding to a portion of each URL;
    form a Trie from the tokenized URLs, wherein each node of the Trie corresponds to one of the URL path tokens;
    assign a weight to each node in the Trie based at least in part on user traffic to the node, wherein assignment of weight to each node in the Trie is based on a number of times a URL including the node has been accessed by a user and a number of descriptor nodes in a sub-tree of the node, wherein a descriptor node is a node that corresponds to a final token of a URL;
    determine whether a total number of nodes in the Trie exceeds a threshold number;
    in response to a determination that the total number of nodes in the Trie exceeds the threshold number, merge child nodes of a lowest weight node in the Trie into a merged node represented by a merged node token;
    determine when the Trie is stable;
    determine that a URL path is finalized when, for each node in the URL path, no new child nodes have been added in a predetermined period; and
    output URL classifications based on finalized URL paths in the Trie after determining that the Trie is stable.

11. The system of claim 10, wherein, to assign a weight to each node, the instructions are to cause the processing resource to:
    count a number of hits to each node by counting one user access to a URL including said node as a hit to said node, multiple user accesses to a URL including said node as multiple hits to said node and multiple user access to a plurality of different URLs including said node as multiple hits to said node; and assign a weight to each node based on the counted number of hits to said node.

12. The system of claim 10, wherein the instructions are to cause the processing resource to:

determine that a path from a root of the Trie to one of the descriptor nodes is finalized if no new child node has been added to any node in the path after a predetermined period; and output the finalized path as a URL classification.

13. The system of claim 10, wherein the instructions are to cause to the processing resource to:

determine that the Trie is stable when an order of nodes by weight in the Trie has not changed in a predetermined period or when a number of changes to an order of nodes by weight in the Trie in a predetermined period is below a predetermined threshold; and output the URL classification only after the Trie is determined to be stable.

14. The system of claim 10, wherein the instructions are to cause the processing resource to:

continue merging child nodes of a lowest weight node in the Trie until the total number of nodes in the Trie is less than the threshold number.

15. The method of claim 1, further comprising:

continuing selecting a node having a lowest weight in the Trie and merging child nodes of the selected node until the total number of nodes in the Trie is less than the threshold number.

16. The non-transitory machine readable storage medium of claim 4, wherein the instructions are to cause the processing resource to:

continue selecting a node in the Trie having a lowest weight and merging child nodes of the selected node until the total number of nodes in the Trie is less than the threshold number.

17. The non-transitory machine readable storage medium of claim 4, wherein assigning a weight to each node in the Trie includes decreasing the weight of each node when the number of descriptor nodes in a sub-tree of the node increases.

* * * * *